(12) United States Patent
Lim et al.

(10) Patent No.: US 9,549,374 B2
(45) Date of Patent: Jan. 17, 2017

(54) MOBILE TERMINAL OPERATING BASED ON USE PATTERN AND CONTROLLING METHOD THEREOF

(71) Applicant: LG ELECTRONICS INC., Seoul (KR)

(72) Inventors: Gukchan Lim, Seoul (KR); Jongbeom Kim, Seoul (KR); Seonghyok Kim, Seoul (KR); Yiseon Jeong, Seoul (KR); Junjeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/311,128

(22) Filed: Jun. 20, 2014

(65) Prior Publication Data

US 2015/0017965 A1    Jan. 15, 2015

(30) Foreign Application Priority Data

Jul. 10, 2013  (KR) .................. 10-2013-0081136

(51) Int. Cl.
| | |
|---|---|
| *H04L 12/28* | (2006.01) |
| *H04L 12/56* | (2006.01) |
| *H04L 12/42* | (2006.01) |
| *H04L 12/403* | (2006.01) |
| *H04W 52/02* | (2009.01) |

(52) U.S. Cl.
CPC ..... *H04W 52/0258* (2013.01); *H04W 52/0277* (2013.01); *Y02B 60/50* (2013.01)

(58) Field of Classification Search
CPC .... H04W 52/0258; H04W 68/04; H04W 4/02; H04W 4/021; H04W 4/023; H04W 4/025; H04W 4/028; Y02B 60/50; Y02B 60/144; G06Q 30/0261; H04M 1/72572; H04M 3/42348

USPC ........... 455/343.4, 414.1, 418, 456.1, 456.3, 455/456.6, 574
See application file for complete search history.

(56) References Cited

U.S. PATENT DOCUMENTS

| | | | | |
|---|---|---|---|---|
| 6,721,546 | B1 * | 4/2004 | Compton | G08C 17/00 340/10.2 |
| 8,258,942 | B1 * | 9/2012 | Lanzone | G08B 21/0272 340/3.1 |
| 8,862,715 | B1 * | 10/2014 | Tom | H04L 67/12 455/456.1 |
| 2006/0156209 | A1 * | 7/2006 | Matsuura | G06Q 10/10 714/798 |

(Continued)

*Primary Examiner* — Rafael Pérez-Gutiérrez
*Assistant Examiner* — Mark G. Pannell
(74) *Attorney, Agent, or Firm* — Lee, Hong, Degerman, Kang & Waimey PC

(57) ABSTRACT

A mobile terminal and controlling method thereof are disclosed, which facilitates a terminal to be used in further consideration of user's convenience. The present invention includes a sensing unit including at least one sensor and a controller analyzing a user's mobile terminal use pattern based on a sensing signal received through the at least one sensor, the controller controlling a power of the at least one sensor based on the use pattern and a remaining power of the mobile terminal. Accordingly, powers of a plurality of sensors can be efficiently controlled based on a user's use pattern and/or a remaining power level. And, a user can activate a specific application and/or view a content with ease in a manner of analyzing a user's use pattern for a mobile terminal and then estimating and providing an application and/or a content necessary for the user based on a result of the analysis.

14 Claims, 9 Drawing Sheets

(56) References Cited

U.S. PATENT DOCUMENTS

| | | | | |
|---|---|---|---|---|
| 2007/0287473 | A1* | 12/2007 | Dupray | H04W 4/02 455/456.1 |
| 2008/0061963 | A1* | 3/2008 | Schnitz | G06Q 10/08 340/539.13 |
| 2009/0069861 | A1* | 3/2009 | Gandhi | A61N 1/37247 607/30 |
| 2011/0164148 | A1* | 7/2011 | Akiyoshi | H04N 5/232 348/231.99 |
| 2011/0313690 | A1* | 12/2011 | Sato | G01C 17/38 702/57 |
| 2013/0346347 | A1* | 12/2013 | Patterson | G06N 99/005 706/12 |
| 2014/0024392 | A1* | 1/2014 | Su | H04W 4/025 455/456.2 |
| 2014/0169252 | A1* | 6/2014 | Banerjee | H04W 4/02 370/311 |
| 2014/0354850 | A1* | 12/2014 | Kosaka | H04N 5/23216 348/231.5 |

* cited by examiner (a)

| Circumstance cognitive level | |
|---|---|
| 1st level | 30% consumed |
| 2nd level | 20% consumed |
| 3rd level | 10% consumed |
| 4th level | off |

(b)

(c)

(a)  (b)

(c)  (d)

Every weekday morning
To subway 0600 ~ 0620
- Moving on foot
- Playing a music player
- Activating a subway arrival time application
- Composing/sending a text message to a specific counterpart
< 802 >

| | 1st level <All sensors enabled> | 2nd level <High-power sensor disabled> | 3rd level <All sensors disabled> |
|---|---|---|---|
| Obtain location information using GPS sensor <901> | On | Off | Off |
| Obtain location information using cell ID <902> | On | On | Off |
| Determine terminal motion using gyro sensor <903> | On | Off | Off |
| Determine terminal motion using accelerometer <904> | On | On | Off |
| Measure bio status using ECG and PPG <905> | On | Off | Off |
| Measure bio status using BMP, HRV and RRI <906> | On | On | Off |

MOBILE TERMINAL OPERATING BASED ON USE PATTERN AND CONTROLLING METHOD THEREOF

Pursuant to 35 U.S.C. §119(a), this application claims the benefit of earlier filing date and right of priority to Korean Application No. 10-2013-0081136, filed on Jul. 10, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Particularly, the hardware performance enhancement of a terminal diversifies types of sensors provided to the terminal. Yet, although sensor types are diversified, since a terminal usually uses a specific sensor singularly, utilization of sensors stays on a low level. Moreover, signals detected by sensors are handled as noise unless a specific function is enabled. Hence, various types of sensors fail to meet utilization of sensors.

Recently, in order to further enhance sensor utilization, sensors of various types tend to be used compositively/synthetically. A terminal detects and learns a user's terminal use pattern by using/analyzing sensing signals sensed by sensors of various types synthetically and then determines a user's intention from other sensing signals detected later.

However, a terminal should minimize its power consumption to meet the demand for portability of the terminal. As mentioned in the foregoing description, if sensing signals detected from various sensors are detected and analyzed all the time, it may possibly cause power consumption.

Thus, in order to minimize power consumption despite utilizing various sensors actively, the demand for a method of controlling powers of sensors effectively is rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which power for sensors of various types can be efficiently controlled to minimize waste of power.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal on controlling a power saving mode according to the present invention may include a sensing unit including at least one sensor and a controller analyzing a user's mobile terminal use pattern based on a sensing signal received through the at least one sensor, the controller controlling a power of the at least one sensor based on the use pattern and a remaining power of the mobile terminal.

In another aspect of the present invention, as embodied and broadly described herein, a method of controlling a mobile terminal in controlling a power saving mode according to the present invention may include the steps of analyzing a user's mobile terminal use pattern based on a sensing signal received through e at least one sensor included in a sensing unit and controlling a power of the at least one sensor based on the use pattern and a remaining power of the mobile terminal.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 9 is a diagram for one example of applying activation/deactivation of sensors step by step.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
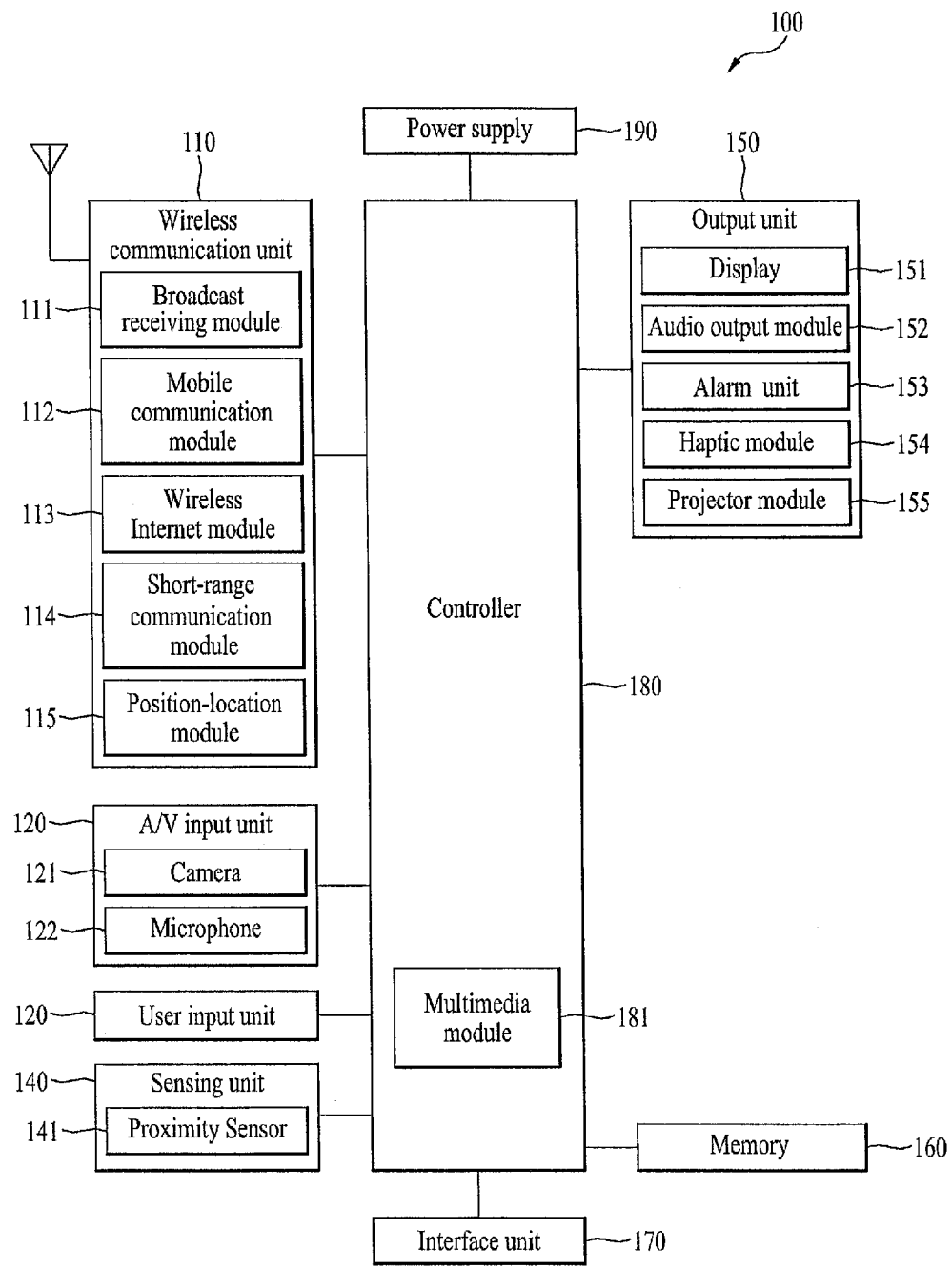
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
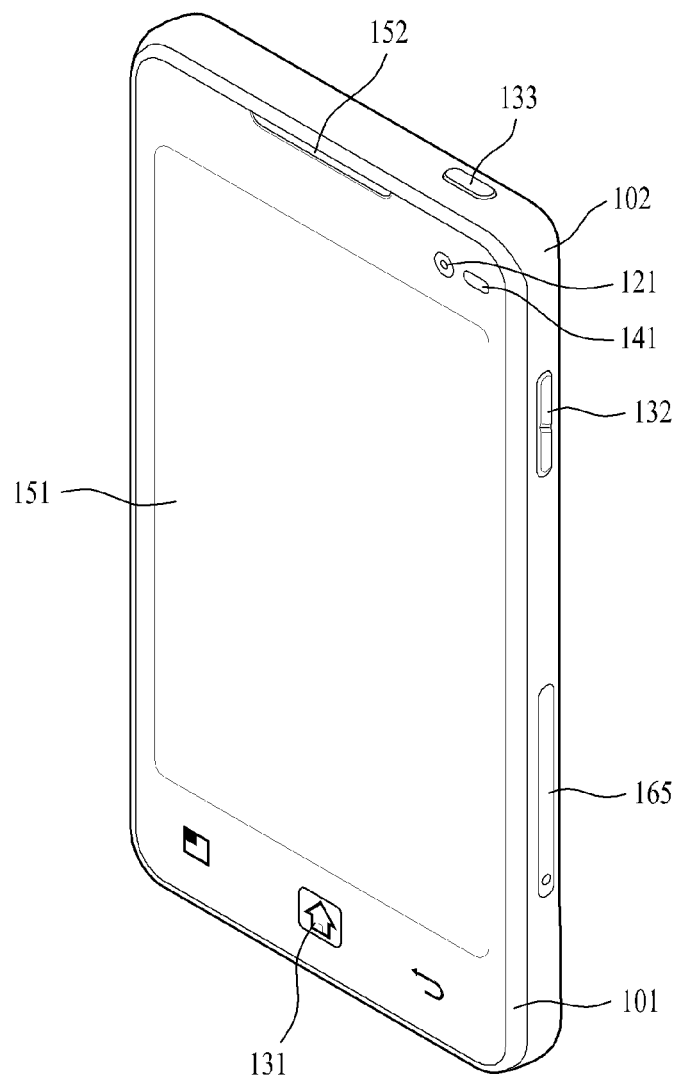
FIG. 2 is a front perspective diagram for one example of a mobile or portable terminal according to the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
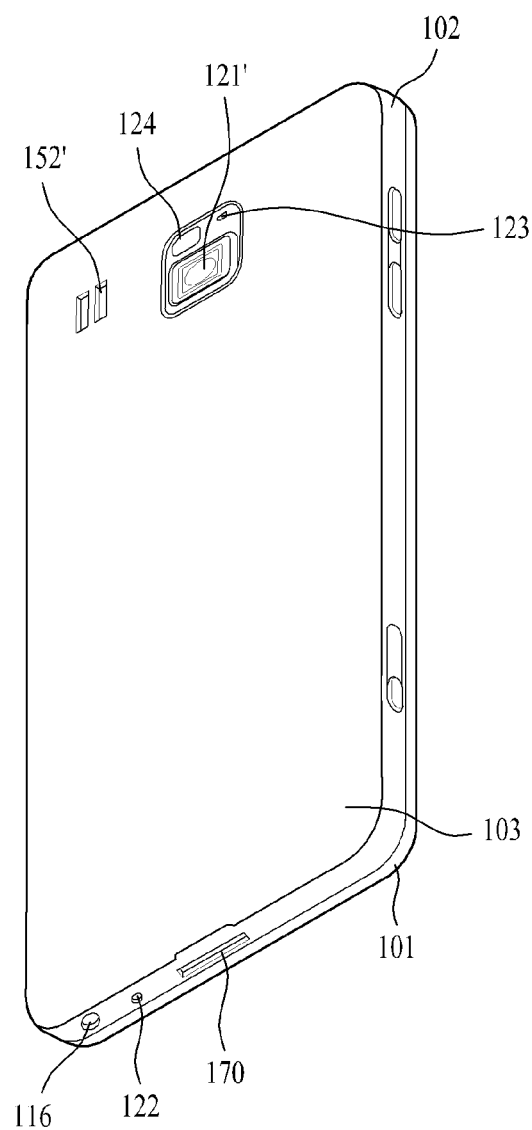
FIG. 3 is a rear perspective diagram of the mobile terminal shown in FIG. 2.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
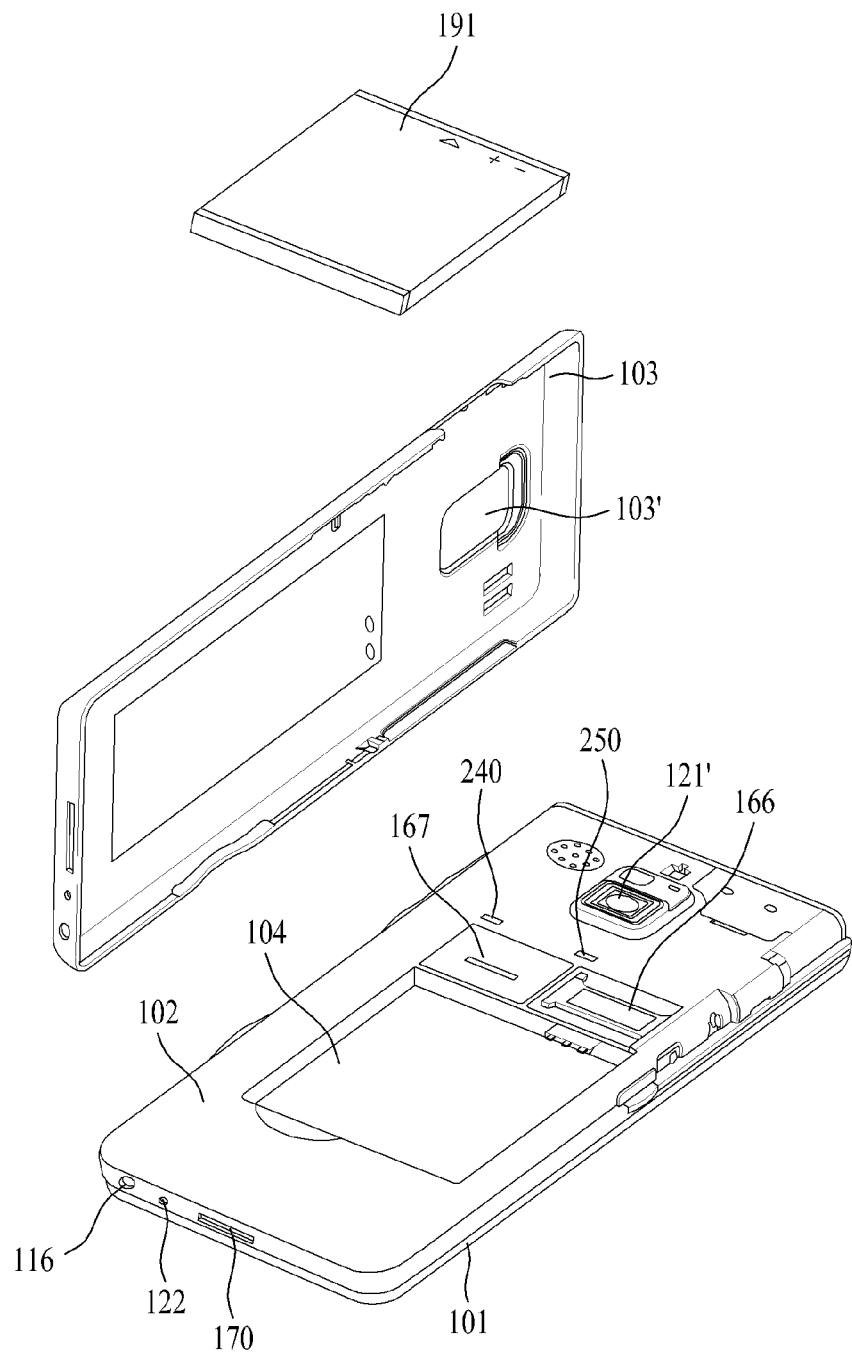
FIG. 4 is a rear perspective diagram of a surface of a rear case exposed by separating a rear cover of a mobile terminal according to one embodiment of the present invention.

FIG. 4 is a rear perspective diagram of a surface of a rear case exposed by separating a rear cover of a mobile terminal according to one embodiment of the present invention.

Referring to FIG. 4, a front case 101, a rear case 102, a rear cover (or a battery cover) 103, a camera 121', an interface unit 170, a microphone 122, a speaker module 154, an audio output unit 152', a battery 191, a battery loading unit 104, a USIM card loading unit 166, and a memory card loading unit 167 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. In case that the replaceable type is adopted, the battery loading unit 104 is formed on the surface of the rear case 102 to enable a user to detach the corresponding battery. In this case, a contact terminal is provided to the battery loading unit 104 to be electrically connected to a part installed within the case.

The USIM card loading unit 166 or the memory card loading unit 167 may be provided, as shown in FIG. 4, next to the battery loading unit 104. Alternatively, the USIM card loading unit 166 or the memory card loading unit 167 may be provided to a bottom surface of the battery loading unit 104. Hence, the battery 191 can be externally exposed if the battery 191 is unloaded from the battery loading unit 104. In this case, since a size of the battery loading unit 104 is extensible, the battery 191 can be oversized.

Although FIG. 4 shows the configuration that the USIM card loading unit 166 or the memory card loading unit 167 is mounted on a backside of the rear case 102, it can be inserted in or separated from the mobile terminal 100 in a manner of being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure (not shown in the drawing). Hence, when rear case 102 and the rear cover 103 are connected to each other, the waterproof structure can seal up the gap between the rear case 102 and the rear cover 103.

Nowadays, in the flood of information, the technology of selecting necessary and accurate information and analyzing the selected information is mandatory. In particular, as the types of sensors provided to a terminal get diversified, sizes of sensing signal informations detected by the diversified sensors are not negligible. Thus, the demand for a method of sorting necessary signals from the rapidly increasing sensing signals and effectively analyzing the sorted sensing signals is rising.

According to one embodiment of the present invention mentioned in the following description, a following method is proposed. First of all, a user's terminal use pattern is analyzed in a manner of compositively analyzing sensing signals detected by various sensors. Secondly, a user's intention of using a terminal in the future is estimated based on a result of the analysis. In particular, in order to provide a service suitable for a situation of each single user, the present invention proposes to analyze a user pattern by individually controlling operations of several sensors per place and time.

Moreover, according to one embodiment of the present invention, in controlling a power of each of a plurality of sensors, proposed is a method of determining whether to control each power through a user's use pattern. In particular, based on a use pattern learned per place and time, a power of each of a plurality of sensors is selectively controlled. Thus, a power consumption of a terminal can be effectively operated and managed. And, a user's terminal use pattern can be updated through an additional detection of user environment information.

In the following description, controlling methods, which can be implemented in the above-configured mobile terminal, according to embodiments of the present invention are explained with reference to the accompanying drawings.

Figure 5:
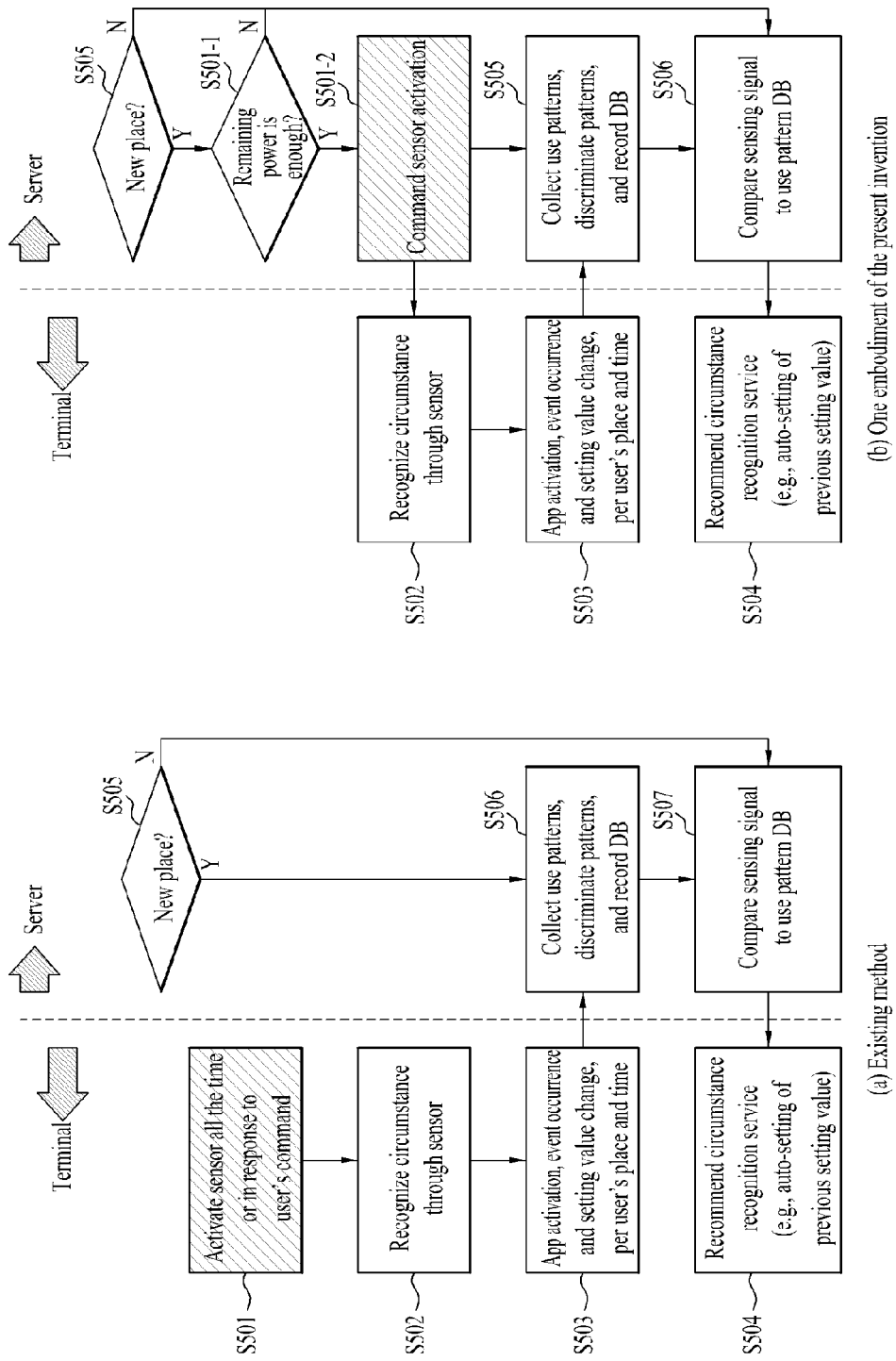
FIG. 5 is a flowchart to schematically describe differences between an existing method and an embodiment of the present invention.

FIG. 5 is a flowchart to schematically describe differences between an existing method and an embodiment of the present invention.

FIG. 5 (a) shows a terminal controlling method according to a related art. FIG. 5 (b) shows a controlling method according to one embodiment of the present invention. A control operation shown in each of FIG. 5 (a) and FIG. 5 (b) is illustrated in a manner of being divided into a server operation and a terminal operation.

A control operation in an existing method shown in FIG. 5 (a) is described as follows.

First of all, in a step S501, the mobile terminal 100 activates its sensors all the time. Alternatively, the mobile terminal 100 may activate a sensor in response to a user's command. In a step S502, the mobile terminal 100 analyzes/recognizes a circumstance by utilizing the activated sensors. Subsequently, in a step S503, the mobile terminal 100 analyzes a user's use pattern. In this case, the user's use pattern may include at least one of an information on an application activated per user's place and time, an information on an occurring event per user's place and time, an information on a changed setting value per user's place and time and the like.

In a step S505, a server obtains a location of the mobile terminal 100 and then determines whether the location of the mobile terminal 100 enters a new place (or a new location). As a result of the determination, if the mobile terminal 100 is situated not at a new location but at a previously entered location, the server can go to a step S507. As a result of the determination, if the mobile terminal 100 enters the new location, the server collects a user's use pattern in a step S506. In doing so, the collection of the user pattern can be performed in a manner that the former use pattern collected by the mobile terminal 100 in the step S503 is delivered to the server. In the steps S505, the server can record the collected user's use pattern in a manner of creating a database (DB) and placing it on the created database.

In the step S507, the server compares a sensed signal to the user pattern database (DB). If a pattern matching a sensing signal sensed by the mobile terminal 100 exists in the use pattern DB, the server can notify/recommend a service according to the use pattern to the user [S504].

According to the method described with reference to FIG. 5 (a), in order to notify/recommend a specific service to a user, a determination of a current location of the mobile terminal 100 and a sensing signal sensed by a sensor are used. In particular, according to the existing method shown in FIG. 5 (a), in order to detect signals through sensors, the sensors are activated all the time or the sensors selected by a user are activated. Specific sensors require considerable power consumptions and collect unnecessary signals frequently. According to the existing method shown in FIG. 5 (a), since such a situation is not taken into consideration at all, it is unable to avoid the waste of unnecessary power. Therefore, according to one embodiment of the present invention shown in FIG. 5 (b), proposed is to add a step S501-1 and a step S501-2 to the existing method.

Referring to FIG. 5 (b), one embodiment of the present invention differs from the existing method shown in FIG. 5 (a) in the step S501-1 and the step S501-2 despite operating almost like the existing method shown in FIG. 5 (a).

In the step S501-1, the server can determine whether a remaining power of the mobile terminal 100 is sufficient. The determination of a presence or non-presence of the sufficient remaining power can be performed in a manner of comparing a remaining power retained by the mobile terminal 100 to a power consumed in collecting the use pattern. For instance, when a level of the remaining power is 20%, if a level of the power consumed in collecting the use pattern is determined as about 10%, a level of the remaining power after use pattern collection becomes 10% only. Hence, the server can determine that the remaining power is not sufficient. If the server determines that the remaining power is not sufficient, the server can go to the step S506.

If the server determines that the remaining power is sufficient, the server can go to the step S501-2. In the step S501-2, the server can transmit a control command for activating a sensor to the mobile terminal 100.

According to the above descriptions of the existing method and the embodiment of the present invention with reference to FIG. 5 (a) and FIG. 5 (b), the server performs the DB creation of the use pattern, the determination of the location of the mobile terminal and/or the determination of the remaining power of the mobile terminal. The server may include an independent device performing operations by exchanging data with the mobile terminal 100 in a manner of being configured separately from the mobile terminal 100. Alternatively, the server may include a module inside the mobile terminal 100 operating in a manner of being provided together with the mobile terminal 100.

As mentioned in the foregoing description with reference to FIG. 5 (b), according to one embodiment of the present invention, it is proposed to determine whether to analyze a user's mobile terminal use pattern in consideration of a current remaining power level of the mobile terminal 100. Particularly, although an analysis is performed, the server can determine whether to use a prescribed sensor in consideration of a remaining power level. The reason for this is that there may be a big difference in power consumption level between similarly functioning sensors.

One example for the server to perform an operation of determining the remaining power level in the above-mentioned step S501-1 is described in detail with reference to FIG. 6 as follows.

Figure 6:
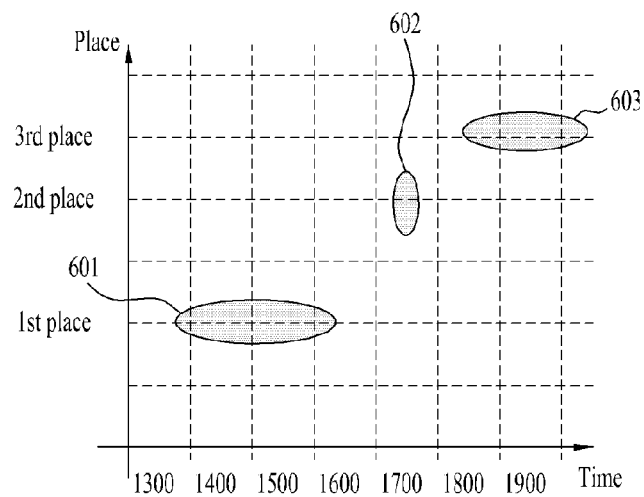
FIG. 6 is a diagram for a detailed example of an operation for a server to determine a remaining power level.
Figure 6:
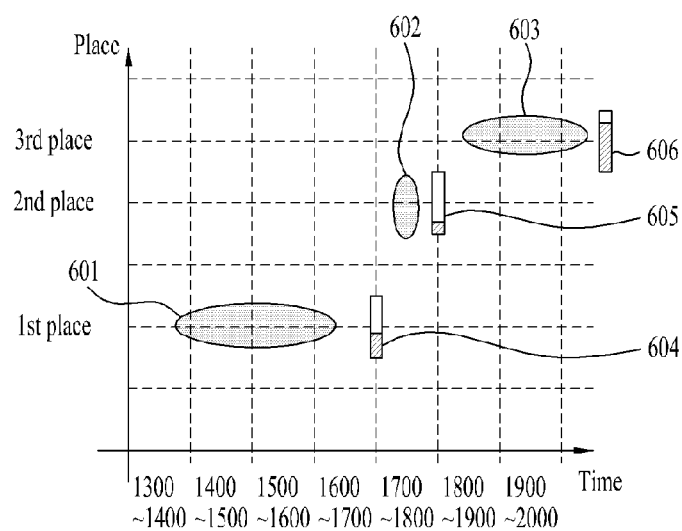

FIG. 6 is a diagram for a detailed example of an operation for a server to determine a remaining power level.

FIG. 6 (a) is a graph of DB data storing an occurrence of a specific event per time and place. In this graph, x-axis may indicate a time and y-axis may indicate a place. For example, in FIG. 6, assume that the specific event is assumed as a charging event. Reference number 601 indicates that the charging event occurs at a location (i.e., a $1^{st}$ place) in a time slot 1300~1700. Reference number 602 indicates that the charging event occurs at a location (i.e., a $2^{nd}$ place) in a time slot 1700~1800. Reference number 603 indicates that the charging event occurs at a location (i.e., a $3^{rd}$ place) in a time slot 1900~2000.

If the event 601 at the $1^{st}$ place is exemplarily analyzed, it may indicate that the charging event has regularly occurred in the specific time slot 1300~1700 at the specific place '$1^{st}$ place'.

Assuming a case that the server stores the above-mentioned use pattern DB, a case that the mobile terminal 100 enters the $1^{st}$ place is described as follows. First of all, if the mobile terminal 100 triggers the charging event by entering the $1^{st}$ place, the server can calculate a remaining power level of the mobile terminal 100. For instance, assume that the calculated remaining power level of the mobile terminal 100 is 60%. The server can select a most appropriate circumstance cognitive level based on the calculated remaining power level. In this case, the circumstance cognitive level indicates an extent of dividing accuracy in recognizing a circumstance into several levels. If the level gets higher, recognition can be performed more accurately by consuming a more power. If the level gets lower, recognition can be performed less accurately by consuming a less power. In particular, if the circumstance cognitive level is the highest (hereinafter, a highest level case is represented as a $1^{st}$ level and other cases next to the highest level case in order shall be represented as a $2^{nd}$ level, a $3^{rd}$ level and so on), circumstances are sensed by activating all of the included sensors as many as possible and the sensed results are then analyzed. As the circumstance cognitive level gets lower gradually, the sensors consuming high powers are sequentially deactivated (disabled). Hence, it is able to derive a recognition result of somewhat low accuracy with reduced power consumption. When a remaining power level is 60%, if a circumstance cognitive level is set to the highest level (i.e., $1^{st}$ level), since a half of the remaining power level should be consumed, it may be determined as inappropriate. Hence, if the server detects the remaining power level of 60%, the server can set the circumstance cognitive level to the $2^{nd}$ level (or lower). If the circumstance cognitive level is set to the $2^{nd}$ level, the server notifies this setting result to the mobile terminal 100. If so, the mobile terminal 100 is able to control the powers of the sensors based on the received setting result. In particular, the mobile terminal 100 can activate/deactivate (enable/disable) a plurality of sensors to correspond to the $2^{nd}$ level.

If the mobile terminal 100 controls the powers of the sensors in response to setting the circumstance cognitive level to the $2^{nd}$ level, the mobile terminal 100 recognizes the circumstance by utilizing the activated sensors and is then able to make a report to the server again. If the server receives the report of the circumstance from the mobile terminal 100, the server adds a new circumstance to a previously saved use pattern DB and updates the use pattern DB.

As a count of updating the use pattern DB is incremented, the updated use pattern DB can enable a user's use pattern to be analyzed more accurately. FIG. 6 (c) is a graph of an accumulated update count in the former graph shown in FIG. 6 (*a*). In order to for the mobile terminal 100 to provide a use pattern DB saved in the DB to a user, the mobile terminal 100 displays update indicator bars 604 to 606, each of which indicates an accumulated update count. In particular, this indicator may indicate the accumulated count in a manner of filling an inside of the indicator bar increasingly in proportion to the corresponding update count. Since one embodiment of the present invention is not characterized in a type of the indicator, any indicators capable of indicating the accumulated count of updates can be used for the present invention. In the example shown in FIG. 6 (*c*), the reference number '603' indicates the highest accumulated count of updates, the reference number '604' indicates the intermediate accumulated count of updates, and the reference number '605' indicates the lowest accumulated count of updates.

Meanwhile, according to one embodiment of the present invention, in setting a circumstance cognitive level, it is intended to provide a user environment for setting the circumstance cognitive level per specific area. Such an embodiment shall be described with reference to FIG. 7 as follows.

Figure 7:
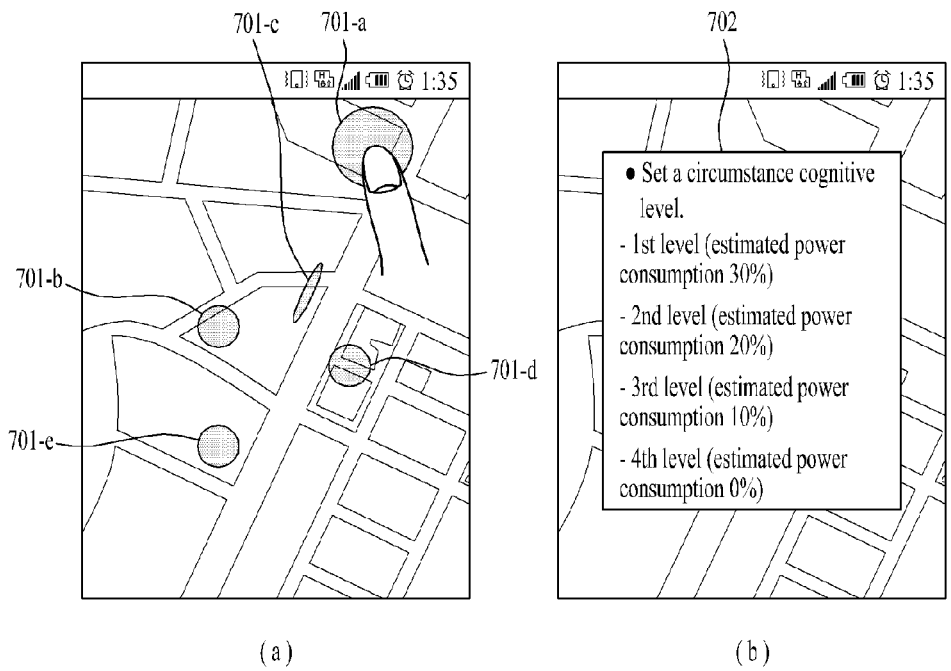
FIG. 7 is a diagram for one example of a method of setting a circumstance cognitive level per specific area according to one embodiment of the present invention.
Figure 7:
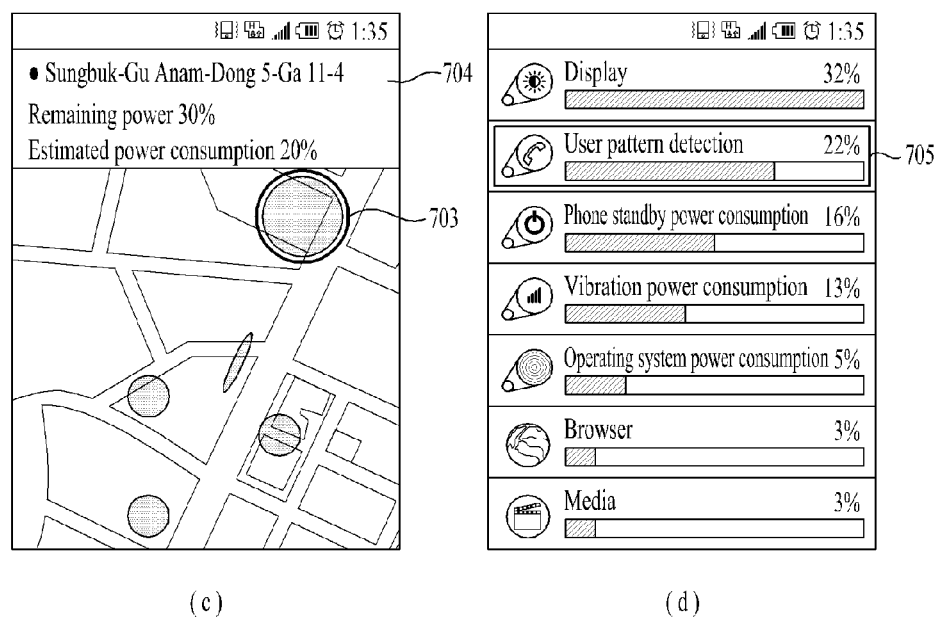

FIG. 7 is a diagram for one example of a method of setting a circumstance cognitive level per specific area according to one embodiment of the present invention.

FIG. 7 (*a*) is a diagram of a status of a setting screen according to one embodiment of the present invention.

Referring to FIG. 7 (*a*), the mobile terminal 100 displays a map on the touchscreen and is also able to display consumption level indicators 701-*a* to 701-*e* on the map to indicate per-area power consumption levels, respectively. For a prescribed area, if an area needs to update a user pattern additionally can be displayed in a manner that the corresponding consumption level indicator is displayed further identifiably. For instance, for an area indicated by the consumption level indicator 701-*a*, if a use pattern saved in a DB is insufficient (i.e., if a learned information size is not sufficient), the controller 180 can control the consumption level indicator 701-*a* to be displayed in relatively large size.

If a user selects the aforementioned consumption level indicator, the user is able to set a circumstance cognitive level for a selected point. In particular, if the controller 180 receives an input (e.g., an input of touching the consumption level indicator 701-*a*) of selecting a prescribed consumption level indicator, the controller 180 can output a popup window 702 for setting a circumstance cognitive level. If the user selects a prescribed level from the popup window 702, the user may be able to set a circumstance cognitive level for a corresponding point.

For a specific point, if a circumstance cognitive level is set, referring to FIG. 7 (*c*), the controller 180 can output a popup window 704 configured to display a setting information on the corresponding point. The popup window 704 may be able to include an area information (e.g., an address information, etc.) on the selected point. And, the setting information on the circumstance cognitive level described with reference to FIG. 7 (*c*) can be displayed on the popup window 704 as well. The setting information shown in FIG. 7 (*c*) displays the information indicating that a current remaining power level of the mobile terminal 100 is 30% and the information indicating that a power consumption estimated according to the circumstance cognitive level setting (i.e., $2^{nd}$ level setting) is 20%.

Moreover, an indicator 703 for identifying the selected point can be displayed on the map screen together with the popup window 704.

As mentioned in the above description, while the circumstance cognitive level is set for the specific area, if the mobile terminal 100 enters the corresponding area, the controller 180 controls powers of sensors by the $2^{nd}$ level setting set up by the user and is able to detect a user's use pattern.

Meanwhile, in detecting a use pattern, there may be a difference between an estimated power consumption amount and an actual power consumption amount. Therefore, according to one embodiment of the present invention, it is proposed that the controller 180 provides the actual power consumption amount to a user.

FIG. 7 (*d*) is a diagram of a status for displaying a use rate per item. If the controller 180 of the mobile terminal 100 receives a command for displaying a per-item use rate from a user, the controller 180 of the mobile terminal 100 can display the status shown in FIG. 7 (*d*).

The per-item use rates may include a power rate consumed for a display, a power consumption rate in a phone call standby mode, and the like. And, it is able to display a power rate consumed for an actually performed use pattern detection in accordance with the circumstance cognitive level set in FIG. 7 (*b*).

Meanwhile, according to the settings in the above-described embodiment, an estimated power consumption is 20%. Yet, as can be observed in the status diagram shown in FIG. 7 (*d*), an actual power consumption is 22%. Thus, there may exist a difference in-between more or less.

According to embodiments of the present invention, a user's use pattern of the mobile terminal 100 is analyzed to estimate a user's intention in the future. Based on the estimated user's intention, the controller 180 is proposed to provide an environment for enabling a user to perform a corresponding operation with ease. Such an environment is described in detail with reference to FIG. 8 as follows.

An operation according to one embodiment of the present invention can be divided into a step of learning a use pattern and a step of utilizing the learned use pattern. In particular, as mentioned in the foregoing description, the use pattern learning step should consider a remaining power level to minimize waste of power. The two steps are described in detail as follows.

Figure 8:
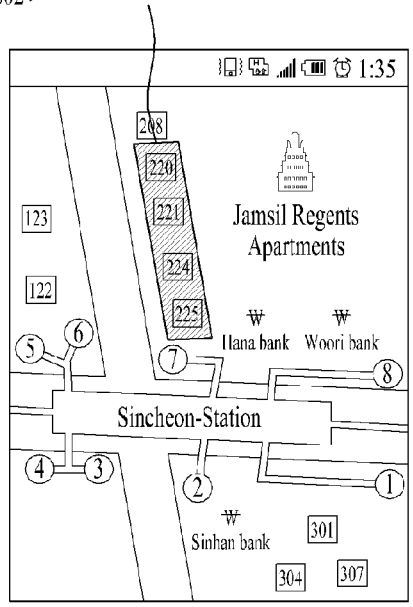
FIG. 8 is a diagram for one example of a method of analyzing and utilizing a use pattern according to one embodiment of the present invention.
Figure 8:
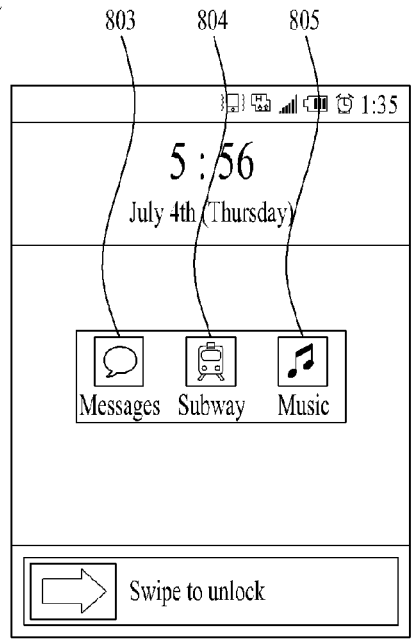
Figure 8:
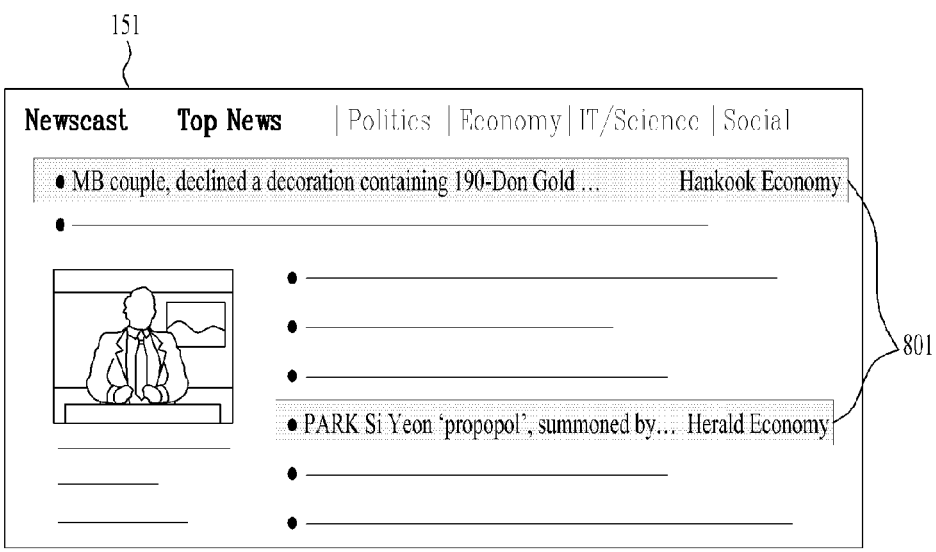

FIG. 8 is a diagram for one example of a method of analyzing and utilizing a use pattern according to one embodiment of the present invention.

Step of Learning a Use Pattern $1^{st}$ Example

FIG. 8 (*a*) is a diagram for one example of a method of learning a use pattern according to one embodiment of the present invention. In the examples described with reference to FIG. 8 (*a*) and FIG. 8 (*b*), assume that a user regularly leaves home in a time slot 0600~0620 and then walks to a subway station (cf. reference number 802). And, assume that the user mainly performs the following actions: 1) Moving on foot; 2) Playing a music player; 3) Activating a subway arrival time application; and 4) Composing/sending a text message to a specific counterpart, on a route 802.

In order to learn a use pattern, the controller 180 can set a circumstance cognitive level based on a user's input or a remaining power level. As mentioned in the foregoing description, the circumstance cognitive level means an extent of discriminating accuracy in recognizing a circumstance. In detecting a use pattern in which a user moves on foot in a specific time slot every morning, the controller 180 may mainly use sensors for detecting a location of the mobile terminal. In particular, if a remaining power level is determined as sufficient, the controller 180 can accurately determine a location variation of the mobile terminal 100 by utilizing a GPS sensor. As a user's specific time/location use pattern, the controller 180 can detect the actions 1) to 4) in the above-described example. The controller 180 reports the detected use pattern to a server and is able to create a database of the detected use pattern.

Step of Utilizing a Use Pattern

1$^{st}$ Example

FIG. 8 (b) is a diagram of a status for one example of a method of utilizing a use pattern in DB. The use pattern described with reference to FIG. 8 (a) is saved and the mobile terminal 100 is situated at a corresponding location. In doing so, if a corresponding time slot is entered, the controller 180 may be able to output a screen of an application recommended to a user. For instance, the controller 180 estimates the actions 2) to 4) in the detected pattern and is then able to provide an activation icon for facilitating an activation of the estimated action to a lock screen of the mobile terminal. Hence, the controller 180 estimates the action 2) and is then able to output a shortcut icon 805 for playing a music player to the lock screen to facilitate a user's access thereto. The controller 180 estimates the action 3) and is then able to output a shortcut icon 804 for activating a subway arrival time guidance application to the lock screen to facilitate a user's access thereto. And, the controller 180 estimates the action 4) and is then able to output a shortcut icon 803 of a text message application to the lock screen to facilitate a user's access thereto. Moreover, when the text message application is activated, the controller 180 is able to provide the user with an activate screen of the application by automatically inputting a usual counterpart of transmission.

According to one embodiment of the present invention, as mentioned in the foregoing description with reference to FIG. 7, a circumstance cognitive level can be set per specific area. In particular, activation/deactivation for each of a plurality of sensors can be set per specific area.

If a user enters a corresponding area by carrying the mobile terminal 100, the controller 180 can automatically control sensors to be activated/deactivated (enabled/disabled) depending on preset conditions. The controller 180 detects a user's use pattern using the activated sensors and is then able to report the detected use pattern to a server.

Step of Learning a Use Pattern

2$^{nd}$ Example

For another example, assume that the controller 180 detects a user's call use pattern in a corresponding area. In particularly, it is intended to describe one example for a following method. First of all, the controller 180 recognizes a user's voice in a user's call use pattern. Secondly, a recommended content is provided to the user based on a result of the corresponding voice recognition.

The controller recognizes a call voice in a user's call use pattern, extracts a keyword from the recognized call voice, and is then able to determine a user's interesting field based on the extracted keyword. For instance, if a keyword for 'President LEE Myung Bak' is extracted from a user's call keyword, the controller 180 may be able to recommend a content related to 'President LEE Myung Bak' to a user.

Thus, an operation of recommending a related content shall be described with reference to FIG. 8 (c) as follows.

Step of Utilizing a Use Pattern

2$^{nd}$ Example

FIG. 8 (c) shows a screen of outputting a news webpage through a web browser application. Based on a keyword obtained from the aforementioned call use pattern analysis, the controller 180 can control a recommended content among news contents to be displayed identifiably. In doing so, in order to be identifiably displayed, the recommended content can be displayed together with a recommendation indicator 801.

In the above example, assume that the controller 180 extracts a keyword 'President LEE Myung Bak' on the assumption that a content for 'President LEE Myung Bak' is included in a user's conversation with a call counterpart. Subsequently, if the user activates a news application (or, a news webpage is outputted from activation of a web browser application), the controller 180 can identifiably display contents associated with the extracted keyword 'President LEE Myung Bak'. Meanwhile, one example of the operation of identifiably displaying a recommended content is described with reference to FIG. 8. And, the present can recommend an application or a prescribed function of the mobile terminal 100 as well.

So far, according to the former embodiments described with reference to FIGS. 6 to 8, a case that a circumstance cognitive level is mainly set by a user is mainly explained. In the following description, a case that the level is set by the determination made by the controller 180 is explained in detail.

According to one embodiment of the present invention, conditions considered in controlling a power of each of sensors may include a current remaining power level of the mobile terminal 100 and/or an amount of a learned use pattern.

Consideration of a Remaining Power Level

If a remaining power level of the mobile terminal 100 is enough, the controller 180 can detect a use pattern by fully activating all sensors. In particular, if the remaining power level is equal to or greater than a prescribed value, the controller 180 can activate all sensors. Subsequently, the controller 180 learns a user's use pattern with high accuracy/precision through the activated sensors and is then able to report a result of the learning to a server.

If the remaining power level of the mobile terminal 100 is not enough, the controller 180 can minimize a power consumed for use pattern detection by controlling power levels of the sensors. Two kinds of methods are proposed as a method of controlling power levels of sensors. According to a 1$^{st}$ method, if a sensor configured to consume a high power and a sensor configured to consume a low power exist in sensors capable of performing similar functions, a user pattern is detected using the sensor configured to consume a low power rather than the sensor configured to consume a high power.

For instance, sensors configured to detect a motion of the mobile terminal 100 may include a gyro sensor and an accelerometer sensor. In particular, the gyro sensor is able to measure an inclination of the mobile terminal 100 and consumes a power more than that of the other. The accelerometer sensor is able to measure an acceleration variation of the mobile terminal 100 and consumes a power relatively smaller than that of the gyro sensor. Each of the two sensors can detect a motion of the mobile terminal 100. And, the two sensors can analyze similar patterns despite differing from each other in detailed functions.

For another instance, as one example of a sensor capable of obtaining a location information of the mobile terminal 100, there may be a GPS (global positioning system) sensor. The GPS sensor has an advantage of measuring the location information of the mobile terminal 100 accurately but has a disadvantage of consuming a high power. As another example of a method of obtaining a location information of the mobile terminal 100, there is a method of obtaining a location information of a cell ID (cell info) or a Wi-Fi access point (AP). Although the location information obtained by this method may not be accurate than the location information measured by the GPS sensor, this method consumes a power less than that of the case of utilizing the GPS sensor.

Particularly, a recently issued bio sensor has such a power difference. ECG (electrocardiogram) sensor or PPG sensor has a relatively high power consumption but has a relatively low power consumption in measuring BPM (beats per minute), HRV (heart rate variability), RRI or the like.

FIG. 9 is a diagram for one example of applying activation/deactivation of sensors step by step. In the example shown in FIG. 9, a circumstance cognitive level corresponds to one of $1^{st}$ to $3^{rd}$ levels. Methods 901, 903 and 905 are estimated to have high power consumptions, while methods 902, 904 and 906 are estimated to have low power consumptions.

If the circumstance cognitive level corresponds to the $1^{st}$ level, while all kinds of sensors are activated, it is able to recognize circumstances. Hence, a precise use pattern is obtained by utilizing the methods 901 to 906 and can be then sent to a server.

If the circumstance cognitive level corresponds to the $2^{nd}$ level, the sensors corresponding to the high power consuming methods are deactivated but the sensors corresponding to the low power consuming methods are activated only. Although the precision of the obtained use pattern may be lowered, this method can be appropriate for a case that a remaining power level is low.

Finally, if the circumstance cognitive level corresponds to the $3^{rd}$ level, an operation of obtaining and analyzing a use pattern may not be performed by deactivating all sensors. Yet, if a previously learned use pattern is saved in a server, it may be able to perform an operation using the previously saved use pattern only.

According to a $2^{nd}$ method, a rarely used sensor is deactivated using a previous use pattern. For instance, assume that working hours on weekdays are regular and that a location of the mobile terminal 100 is not changed during the working hours. If so, sensors for obtaining location information using GPS sensor and/or cell ID may be unnecessary. Hence, if it is determined that a remaining power level is not enough, the controller 180 can minimize waste of power by deactivating the corresponding sensors during the working hours on weekdays.

Amount of Learned Use Pattern

A method of controlling powers of sensors in consideration of an amount of a learned use pattern is described as follows. First of all, if an amount of a learned use pattern is enough to create a DB, it may be unnecessary to further learn a use pattern irrespective of whether a remaining power level is enough. In this case, it may be appropriate for the mobile terminal 100 to provide a user with an operation of utilizing a learned use pattern only rather than to learn a use pattern. Therefore, according to one embodiment of the present invention, as the learned use pattern amount saved in a server is equal to or greater than a predetermined count, if the controller 180 determines that the learned user pattern amount is enough, the controller 180 deactivates sensors and may not perform an operation of obtaining a use pattern, analyzing the obtained use pattern, and then reporting the analysis to a server.

If the controller 180 determines that a use pattern for a current place and/or time is not enough, the controller 180 activates sensors and is then able to perform an operation of obtaining a use pattern using the activated sensors and then reporting the obtained use pattern to the server.

Meanwhile, according to the above-described embodiment, activation/deactivation of sensors is explained. The activation/deactivation includes an operation of controlling whether to cut/allow powers self-used by sensors and is also able to indicate an operation of controlling whether to analyze a sensing signal despite that a power is used by a sensor in itself. In particular, if the controller 180 deactivates a prescribed sensor, it may mean that the controller 180 cuts off a power for the prescribed sensor and that the controller does not analyze a sensing signal detected from the prescribed sensor despite not cutting off the power for the prescribed sensor. The reason for this is that a power consumption for an operation of analyzing a sensing signal by an AP (application processor) is considerable despite that the prescribed sensor has a negligible power consumption difference between cutting off a power for the prescribed sensor and allowing a power for the prescribed sensor.

Therefore, according to one embodiment of the present invention, the controller 180 controls MCU (micro controller unit) for controlling sensors to be configured separately from AP (application processor). The MCU controls the sensors to detect sensing signals. And, the AP can analyze the detected sensing signals. Moreover, deactivation of a prescribed sensor can be replaced by not performing an analysis operation by the AP.

Accordingly, embodiments of the present invention provide various effects and/or features.

According to at least one of embodiments of the present invention, user's intention can be determined by actively utilizing various types of sensors provided to a terminal.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a sensor;
a touchscreen capable of displaying contents; and
a controller capable of:

identifying a location of the mobile terminal and determining whether the location is a new location or a previous location of the mobile terminal;

causing the sensor to be activated to sense use patterns and storing the use patterns in a database of a server in communication with the mobile terminal when the location of the mobile terminal is a new location and a remaining power level of the mobile device exceeds a threshold level;

causing the sensor to be deactivated when the location of the mobile terminal is a previous location or a remaining power level of the mobile device does not exceed a threshold level;

identifying a user's use pattern of the mobile terminal based on stored use patterns of the database;

setting a circumstance cognitive level per specific area based on a power consumption level used in the specific area;

controlling a function of the sensor based on the use pattern and the power consumption level of the mobile terminal; and controlling the touchscreen to display:

a current remaining power level of the mobile terminal and information indicating a power consumption estimated according to the circumstance cognitive level setting, a recommended application or recommended content based on the use pattern when a current location of the mobile terminal is within a threshold range of a previous location wherein the use pattern comprises information related to the recommended application which was executed when the mobile terminal was positioned at the previous location or the recommended content which was displayed when the mobile terminal was positioned at the previous location, and a recommended application or recommended content based on the use pattern when a current time is within a threshold range of a particular time of a previous day wherein the use pattern comprises information related to the recommended application which was executed at the particular time of the previous day or content which was displayed at the particular time of the previous day.

2. The mobile terminal of claim 1, wherein the controller is further capable of:

causing the sensor to be in an activated state when the power level is greater than a threshold amount; and causing the sensor to be in a deactivated state when the power level is less than the threshold amount.

3. The mobile terminal of claim 1 further comprising a plurality of sensors, wherein:

the plurality of sensors comprises a first sensor group and a second sensor group; and the controller is further capable of causing the first sensor group to be in a deactivated state when the power level of the mobile terminal is less than a first value.

4. The mobile terminal of claim 3, wherein the controller is further capable of causing the second sensor group to be in the deactivated state when the power level of the mobile terminal is less than a second value, wherein the second value is less than the first value.

5. The mobile terminal of claim 1 further comprising a memory, wherein the controller is further capable of causing the memory to store the use pattern and cause the sensor to be in a deactivated state when an amount of the stored use pattern exceeds a threshold stored amount.

6. The mobile terminal of claim 1, further comprising a memory, wherein:

the sensor comprises a location sensor configured to detect location information of the mobile terminal; and the controller is further capable of:

causing the memory to store the use pattern comprising the detected location information; and causing the sensor to be deactivated when an amount of the stored use pattern comprising location information exceeds a threshold stored location amount.

7. The mobile terminal of claim 1, wherein the mobile terminal comprises at least a global positioning system (GPS) sensor, a gyro sensor, or an accelerometer sensor.

8. A method of controlling a mobile terminal comprising:

identifying a location of the mobile terminal and determining whether the location is a new location or a previous location of the mobile terminal;

activating a sensor of the mobile terminal to sense use patterns and storing the use patterns in a database of a server in communication with the mobile terminal when the location of the mobile terminal is a new location and a remaining power level of the mobile device exceeds a threshold level;

deactivating the sensor when the location of the mobile terminal is a previous location or a remaining power level of the mobile device does not exceed a threshold level;

identifying a user's use pattern of the mobile terminal based on stored use patterns of the database;

setting a circumstance cognitive level per specific area based on a power consumption level used in the specific area;

controlling a function of the sensor based on the use pattern and the power consumption level of the mobile terminal; and displaying a current remaining power level of the mobile terminal and information indicating a power consumption estimated according to the circumstance cognitive level setting, displaying a recommended application or recommended content based on the use pattern when a current location of the mobile terminal is within a threshold range of a previous location wherein the use pattern comprises information related to the recommended application which was executed when the mobile terminal was positioned at the previous location or the recommended content which was displayed when the mobile terminal was positioned at the previous location, and displaying a recommended application or recommended content based on the use pattern when a current time is within a threshold range of a particular time of a previous day wherein the use pattern comprises information related to the recommended application which was executed at the particular time of the previous day or content which was displayed at the particular time of the previous day.

9. The method of claim 8, further comprising:

causing the sensor to be in an activated state when the power level is greater than a threshold amount; and causing the sensor to be in a deactivated state when the power level is less than the threshold amount.

10. The method of claim 8, further comprising:

causing a first sensor group to be in a deactivated state when the power level is less than a first value; and wherein the mobile terminal comprises a plurality of sensors comprising the first sensor group and a second sensor group.

11. The method of claim 10, further comprising causing the second sensor group to be in a deactivated state when the power level is less than a second value, wherein the second value is less than the first value.

12. The method of claim 8, further comprising:
- storing the use pattern in a memory; and
- causing the sensor to be deactivated when an amount of the stored use pattern exceeds a threshold stored amount.

13. The method of claim 8, further comprising:
- detecting location information of the mobile terminal via the sensor;
- storing the use pattern comprising the detected location information in a memory; and
- causing the sensor to be deactivated when an amount of the stored use pattern comprising location information exceeds a threshold stored location amount.

14. The method of claim 8, wherein the mobile terminal comprises at least a global positioning system (GPS) sensor, a gyro sensor, or an accelerometer sensor.

* * * * *